(12) United States Patent
Dinka et al.

(10) Patent No.: US 8,369,498 B2
(45) Date of Patent: Feb. 5, 2013

(54) TELEVISION SET

(75) Inventors: David Dinka, London (GB); Gisela Gier, London (GB)

(73) Assignee: Skype, Dublin (IE)

( * ) Notice: Subject to any disclaimer, the term of this patent is extended or adjusted under 35 U.S.C. 154(b) by 231 days.

(21) Appl. No.: 12/843,543

(22) Filed: Jul. 26, 2010

(65) Prior Publication Data

US 2011/0242270 A1    Oct. 6, 2011

(30) Foreign Application Priority Data

Mar. 31, 2010 (GB) .................................. 1005465.8

(51) Int. Cl.
H04M 11/00    (2006.01)
(52) U.S. Cl. .............. 379/93.21; 379/202.01; 348/14.04
(58) Field of Classification Search ................ 348/14.01, 348/14.03, 14.04, 14.07, 14.08; 379/93.21, 379/158, 202.01, 201.12
See application file for complete search history.

(56) References Cited

U.S. PATENT DOCUMENTS

| | | | |
|---|---|---|---|
| 7,908,630 B2 | 3/2011 | Crandall et al. | |
| 2004/0194146 A1 | 9/2004 | Bates et al. | |
| 2005/0034079 A1* | 2/2005 | Gunasekar et al. | 715/753 |
| 2005/0122963 A1 | 6/2005 | Jeon et al. | |
| 2007/0115348 A1 | 5/2007 | Eppel et al. | |
| 2008/0081698 A1 | 4/2008 | Wormald et al. | |
| 2008/0157998 A1* | 7/2008 | Zuo et al. | 340/825.24 |
| 2008/0235587 A1 | 9/2008 | Heie et al. | |
| 2008/0239995 A1 | 10/2008 | Lee et al. | |
| 2009/0017792 A1 | 1/2009 | Matsumoto et al. | |
| 2009/0136016 A1 | 5/2009 | Gornoi et al. | |
| 2009/0271820 A1 | 10/2009 | Choi et al. | |
| 2010/0254670 A1 | 10/2010 | Amsterdam et al. | |
| 2011/0021200 A1 | 1/2011 | Yi et al. | |
| 2011/0109715 A1 | 5/2011 | Jing et al. | |

(Continued)

FOREIGN PATENT DOCUMENTS

| | | |
|---|---|---|
| EP | 1 475 939 A1 | 11/2004 |
| EP | 1 816 843 A1 | 8/2007 |

(Continued)

OTHER PUBLICATIONS

Notification of Transmittal of the International Search Report and the Written Opinion of the International Searching Authority for Int'l Application No. PCT/EP2011/054864; Date Mailed: May 31, 2011, 13 pp.

(Continued)

*Primary Examiner* — Olisa Anwah
(74) *Attorney, Agent, or Firm* — Wolfe-SBMC

(57) ABSTRACT

A media appliance comprising: video apparatus for outputting signals to a screen; a network interface for accessing a packet-based network; a memory storing a communication client application; and processing apparatus arranged to execute the communication client application. The client application is configured to allow a local user of the media appliance to participate in bidirectional communication sessions with other remote users via the network interface and packet-based network. The client application is further configured so as: to receive an invitation signal from a remote user terminal over the packet-based network, the received invitation signal comprising a trigger condition specifying a future event for triggering participation of the media appliance in a proposed one of said communication sessions with said remote user terminal; to monitor the received trigger condition at said media appliance; and to join the proposed session in dependence on an occurrence of said event.

18 Claims, 7 Drawing Sheets

U.S. PATENT DOCUMENTS

| | | |
|---|---|---|
| 2011/0242266 A1 | 10/2011 | Blackburn et al. |
| 2011/0242270 A1 | 10/2011 | Dinka |
| 2011/0243141 A1 | 10/2011 | Blackburn et al. |
| 2011/0244955 A1 | 10/2011 | Dinka et al. |

FOREIGN PATENT DOCUMENTS

| | | |
|---|---|---|
| EP | 1 909 467 A1 | 4/2008 |
| EP | 2 056 601 A1 | 8/2008 |
| EP | 2 063 612 A1 | 5/2009 |
| EP | 2 114 062 A1 | 11/2009 |
| GB | 2479180 | 10/2011 |
| JP | 2005-86765 A | 3/2005 |
| WO | WO 2004/066604 A1 | 8/2004 |
| WO | WO 2005/008524 A1 | 1/2005 |
| WO | WO 2005/009019 A2 | 1/2005 |
| WO | WO 2006/051492 A2 | 5/2006 |
| WO | WO 2006/058036 A3 | 6/2006 |
| WO | WO 2007/137485 A1 | 6/2007 |
| WO | WO 2007/118250 A2 | 10/2007 |
| WO | WO 2008/015369 A1 | 2/2008 |
| WO | WO 2009/115048 A1 | 9/2009 |
| WO | WO 2010/026187 A1 | 3/2010 |
| WO | WO 2010/026188 A1 | 3/2010 |
| WO | WO 2010/026189 A1 | 3/2010 |
| WO | WO 2010/026190 A1 | 3/2010 |
| WO | WO 2010/026191 A1 | 3/2010 |
| WO | WO 2010/026194 A1 | 3/2010 |
| WO | WO 2010/026196 A1 | 3/2010 |
| WO | WO-2011120948 | 10/2011 |
| WO | WO-2011120991 | 10/2011 |
| WO | WO-2011120992 | 10/2011 |
| WO | WO-2011121006 | 10/2011 |

OTHER PUBLICATIONS

"International Search Report and Written Opinion", Application No. PCT/EP2011/054781, (May 23, 2011), 13 pages.

"International Search Report and Written Opinion", Application No. PCT/EP2011/054862, (Jun. 27, 2011), 17 pages.

"International Search Report and Written Opinion", Application No. PCT/EP2011/054881, (Jul. 25, 2011), 18 pages.

"Non-Final Office Action", Application No. 12/843,569, (Apr. 4, 2012), 13 pages.

"Search Report", Application No. GB1005462.5, (Jul. 28, 2011), 2 pages.

"Final Office Action", U.S. Appl. No. 12/843,569, (Oct. 9, 2012), 20 pages.

\* cited by examiner

TELEVISION SET

RELATED APPLICATION

This application claims priority under 35 U.S.C. §119 or 365 to Great Britain Application No. 1005465.8, filed Mar. 31, 2010. The entire teachings of the above application are incorporated herein by reference.

FIELD OF THE INVENTION

The present invention relates to a television apparatus having an embedded processing apparatus for conducting voice or video calls via a packet-based network.

BACKGROUND

Some communication systems allow the user of a terminal, such as a personal computer, to conduct voice or video calls over a packet-based computer network such as the Internet. Such communication systems include voice or video over internet protocol (VoIP) systems. These systems are beneficial to the user as they are often of significantly lower cost than conventional fixed line or mobile networks. This may particularly be the case for long-distance communication. To use a VoIP system, the user installs and executes client software on their terminal. The client software sets up the VoIP connections as well as providing other functions such as registration and authentication. In addition to voice communication, the client may also set up connections for other communication media such as instant messaging ("IM"), SMS messaging, file transfer and voicemail.

One type of communication system for packet-based communication uses a peer-to-peer ("P2P") topology. To enable access to a peer-to-peer system, a user executes P2P client software supplied by a P2P software provider on their terminal, and registers with the P2P system. When the user registers with the P2P system, the client software is provided with a digital certificate from a server. This may be referred to as a "user identity certificate" (UIC). Once the client software has been provided with the certificate, then calls or other communication connections can subsequently be set up and routed between end-users ("peers") of the P2P system without the further use of a server in the call set-up. Instead, the client looks up the required IP addresses from information distributed amongst the P2P client software on other end-users' terminals within the P2P system. That is, the address look-up list is distributed amongst the peers themselves. Once the IP address of a callee's terminal has thus been determined, the caller's P2P client software then exchanges UIC certificates with the callee's P2P client software. The exchange of these digital certificates between users provides proof of the users' identities and that they are suitably authorized and authenticated in the P2P system. Therefore the presentation of digital certificates provides trust in the identity of the users.

It is therefore a characteristic of peer-to-peer communication that, once registered, the users can set up their own communication routes through the P2P system in at least a partially decentralized manner based on distributed address look-up and/or the exchange of one or more digital certificates, without using a server for those purposes. Further details of an example P2P system are disclosed in WO 2005/008524 and WO 2005/009019.

VoIP or other packet-based communications can also be implemented using non-P2P systems that do use centralized call set-up and/or authorisation, e.g. via server.

A problem with packet-based communications is that their accessibility to users is limited. In particular, such communications are most commonly accessed using a personal computer. This has the disadvantage that the user must be sufficiently technically competent to download, install and operate the packet-based communication client software on their personal computer, which provides a barrier to the take-up. Even when the communication client is installed and executed on a personal computer, its use may be limited because personal computers are often not located in a place where the user is either familiar or comfortable with communicating. For example, a personal computer is often located in a study which for many users is not the most natural or comfortable environment for making phone calls.

Whilst packet-based communication systems can also be accessed via certain mobile devices, these generally do not have processing resources or display screens available to offer a full range of features, such as video calling.

It would therefore be desirable to make packet-based communications more accessible to users. One way to do this would be to run a packet-based communication client on a processor embedded in a familiar household media appliance like a television set or set-top box for plugging into a television. Embedded in this context means within the casing of the appliance. The ability to integrate an embedded processor into a television set or set-top box is known, and indeed many modern televisions and boxes already contain a processor for performing at least some of the digital signal processing required to decode and output viewable television signals to the screen.

SUMMARY

However, the inventors have recognised that one or more potential problems may still exist due to a conflict between the added functionality of the client application and the existing functionality of a conventional television or other such media appliance.

Particularly, operation of the client is likely to interfere with the user's viewing activity. For example, users may not wish to conduct calls during a favorite television programme, or whilst viewing content from external sources like an external DVD player, games console, etc.

According to one aspect of the present invention there is provided a media appliance comprising: video apparatus for outputting signals to a screen; a network interface for accessing a packet-based network; a memory storing a communication client application; and processing apparatus coupled to the memory, network interface and video apparatus, and arranged to execute the communication client application; wherein the client application is configured so as when executed to allow a local user of the media appliance to participate in bidirectional communication sessions with other remote users via the network interface and packet-based network; and the client application is further configured so as when executed: to receive an invitation signal from a remote user terminal over the packet-based network, the received invitation signal comprising a trigger condition specifying a future event for triggering participation of the media appliance in a proposed one of said communication sessions with said remote user terminal; to monitor the received trigger condition at said media appliance; and to join the proposed session in dependence on an occurrence of said event.

The present invention thus provides a mechanism for planning calls or other such communication sessions around the times of viewing activities such as television programmes, DVD or video games. Particularly, according to the present invention the invitation contains the means to initiate the session. That is, the condition that initiates the session is defined by the remote user; and hence the session can be planned around the viewing activity of not just the local user receiving the incoming call, but also the remote user.

For example, the invite may be generated by a sender who might or might not know the availability of the called party. One scenario could be that the sender wants to send an invite independently of the status of the called party (e.g. "Why don't you join us for a slideshow with pictures from our holiday on Sunday evening"). Another scenario could be that the called party was busy, so that the caller got a busy tone and then sent an invitation for a later session.

In embodiments, the client application may be configured to generate a first control prompt on the screen upon receiving the invitation signal, wherein said monitoring may be dependent on an user-input from the local user in response to the first control prompt.

The client application may be configured to generate a second control prompt on the screen upon occurrence of said event, wherein said joining may be further dependent on an user-input from the local user in response to the second control prompt.

The received invitation signal may comprise information for use in at least one of said first and second control prompts.

The appliance may comprise power control circuitry coupled to the processing apparatus and screen, wherein the client application may be configured to issue a power control command to the power control circuitry upon at least one of receipt of the invitation signal and occurrence of the event, so as to turn on the screen to display at least one of the first and second control prompts respectively.

The client application may be configured so as when executed to allow a local user of the media appliance to participate in multiparty communication sessions with multiple other remote users via the network interface and packet-based network, and the received invitation signal may comprise a trigger condition specifying a future event for triggering a proposed one of said multiparty communication sessions with a plurality of remote user terminals including the remote user terminal from which the invitation signal was received.

The trigger condition may specify a future event for triggering participation of the media appliance in a voice or video call with said remote user terminal via the network interface and packet-based network, wherein the client application may be configured to join the voice or video call in dependence on the occurrence of said event.

The trigger condition may specify a future event for triggering participation of the media appliance in an interactive photo slideshow hosted by said remote user terminal over the packet-based network, wherein the client application may be configured to join the interactive photo slideshow in dependence on the occurrence of said event.

The specified event may comprise a scheduled time, wherein the client application may be configured to monitor whether a current time matches the scheduled time and to join the proposed session in dependence on the match.

The specified event may comprise receipt of a trigger signal from the remote user terminal over the packet-based network, wherein the client application may be configured to monitor for receipt of the trigger signal and to join the proposed session in dependence its receipt.

The media appliance may comprise a control device allowing a user to control the output of signals from the video apparatus to the television screen, thereby selecting a viewing activity; wherein said event may comprise a delineation in the viewing activity, and the client application may be configured to detect an occurrence of the delineation in said viewing activity and to join the proposed session in dependence of said detection.

The media appliance may comprise a television receiver for receiving television signals representing television programmes via a television network; the video apparatus may be coupled to the television receiver, and may be operable to output the television signals of selected television programmes from the television receiver to the screen; the control device may allow a user to control the output of television signals to the screen, thereby selecting a television programmes as said viewing activity; and said event may comprise a delineation in the selected television programme, wherein the client application may be configured to detect an occurrence of the delineation in said television programme and to join the proposed session in dependence of said detection.

According to another aspect of the present invention, there is provided a media appliance comprising: video apparatus for outputting signals to a screen; a network interface for accessing a packet-based network; a memory storing a communication client application; and processing apparatus coupled to the memory, network interface and video apparatus, and arranged to execute the communication client application; wherein the client application is configured so as when executed to allow a local user of the media appliance to conduct bidirectional communication sessions with other remote users via the network interface and packet-based network; and the client application is further configured so as when executed: to transmit an invitation signal to a remote user terminal over the packet-based network, the transmitted invitation signal comprising a trigger condition specifying a future event for triggering participation of the remote terminal in a proposed one of said communication sessions with the media appliance; and to establish the proposed session in dependence a response to the invitation signal from the remote user terminal based on evaluation of the condition at the remote user terminal.

According to another aspect of the present invention, there is provided a method of operating a media appliance comprising video apparatus for outputting signals to a screen, a network interface for accessing a packet-based network, and an embedded processing apparatus; the method comprising: executing a communication client application on the processing apparatus of the media appliance, the client application being configured so as when executed to allow a local user of the media appliance to participate in bidirectional communication sessions with other remote users via the network interface and packet-based network; and receiving an invitation signal from a remote user terminal over the packet-based network, the received invitation signal comprising a trigger condition specifying a future event for triggering participation of the media appliance in a proposed one of said communication sessions with said remote user terminal; wherein the execution of the client application further comprises monitoring the received trigger condition at said media appliance, and joining the proposed session in dependence on an occurrence of said event.

In embodiments, the method may comprise steps in accordance with any appliance described above.

According to another aspect of the present invention, there is provided communication client application for operating a media appliance comprising video apparatus for outputting signals to a screen and a network interface for accessing a packet-based network, the communication client application comprising code embodied on a computer-readable medium and configured so as when executed on a processing apparatus of the media appliance to: enable a local user of the media appliance to participate in bidirectional communication sessions with other remote users via the network interface and packet-based network; receive an invitation signal from a remote user terminal over the packet-based network, the received invitation signal comprising a trigger condition specifying a future event for triggering participation of the media appliance in a proposed one of said communication sessions with said remote user terminal; monitor the received trigger condition at said media appliance; and join the proposed session in dependence on an occurrence of said event.

In embodiments, the communication client may be configured in accordance with any feature of an appliance described above.

BRIEF DESCRIPTION OF THE DRAWINGS

For a better understanding of the present invention and to show how it may be put into effect, reference is made by way of example to the accompanying drawings in which.

DETAILED DESCRIPTION OF PREFERRED EMBODIMENTS

Figure 1:
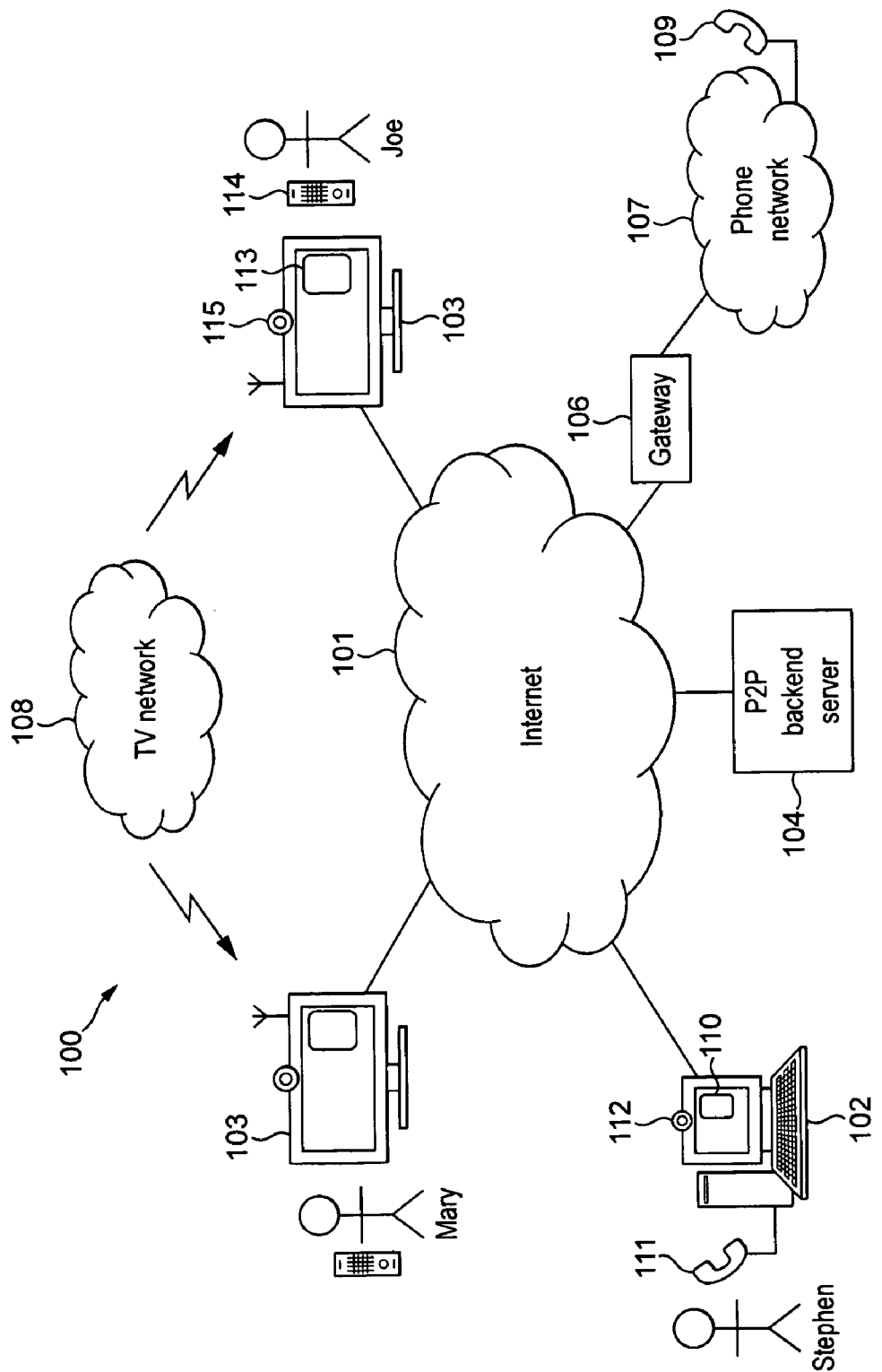
FIG. 1 is a schematic representation of a communication system.

FIG. 1 shows a communication system 100 comprising a packet-based network 101 such as the Internet; and further comprising a separate television broadcasting network 108 such as a terrestrial, satellite or cable television network. A plurality of computer terminals 102 are shown coupled to the Internet 101, each comprising a network interface for communicating over the Internet. A plurality of television sets 103 are also shown coupled to the Internet 101, each of which also comprises a network interface for communicating over the Internet. In addition to the network interface, each television set 103 further comprises a television receiver for receiving analogue and/or digital television signals which are broadcast over the television network 108. Alternatively or additionally, a television set 103 could be arranged to receive packet-based television signals over the Internet 101 or other such packet-based network. However, broadcast television is still popular at the time of writing and so in preferred embodiments the television set 103 will comprise a television receiver for receiving broadcasts at least.

The difference between a broadcast and a communication made over a packet-based network is that broadcast signals are transmitted indiscriminately, without transmitting to selected destination devices and regardless of whether the end-user has selected to receive the signal (although a decryption key or such like may still be required so that only authoried users can derive meaningful information from the television signal for viewing). Packet-based communications on the other hand are point-to-point, with an address of the intended destination device being included in the packets. In the case of packet-based television signals transmitted over the Internet, these are still point-to-multipoint communications rather than a broadcast.

Each computer terminal 102 is installed with a communication client application 110. Each computer terminal 102 also comprises an audio transceiver 111 comprising a speaker and microphone, e.g. in the form of a headset or handset, or a built-in speaker and microphone. Most computer terminals 102 preferably also comprise a webcam 112. Furthermore, each television set 103 comprises an embedded processor and memory installed with a version of the communication client application 113 specially adapted for running on a television set. Each television set 103 also comprises a webcam 115 and an audio transceiver with speaker and microphone, or is connected or communicable with such components. In a particularly preferred embodiment an audio transceiver is provided in a remote control unit 114 of the television 103, discussed shortly.

The communication client applications 110 and 113 are preferably peer-to-peer clients for setting-up and conducting VoIP calls according to peer-to-peer principles as discussed above. To that end, a peer-to-peer backend server 104 is coupled to the Internet 101 for receiving registration requests from the client applications 111 and 113. The back-end server 104 is arranged to distribute UIC certificates to the respective client applications 111 and 113 running on the computer terminals 102 and television sets 103 in response to the registration requests. Once registered and thus in possession of a UIC certificate, the client applications 111 and/or 113 can look-up one another's addresses, exchange and authenticate one another's certificates, and thus establish a voice or video call over the Internet 101. It will be appreciated however that other kinds of communication client could alternatively be used, e.g. based on centralized server-based call set-up.

In addition, the communication system 100 may comprise a telephone network 107 such as a circuit-switched network, and a gateway 106 connecting between the Internet 101 and the telephone network 107. A gateway version of the client application is arranged to run on the gateway 106, and a communication client application 110 or 113 running on a computer terminal 102 or television set 103 is thus able to establish a call with a dedicated phone unit 109 of the telephone network 107. This is achieved by establishing a connection with the client on the gateway 106 using peer-to-peer call set-up and then supplying the relevant telephone number to the gateway 107 (effectively the user's client 110 or 113 sees the gateway 106 as a peer). The phone network 107 may for example comprise a fixed-line network ("landline") and/or a mobile cellular network.

Figure 2:
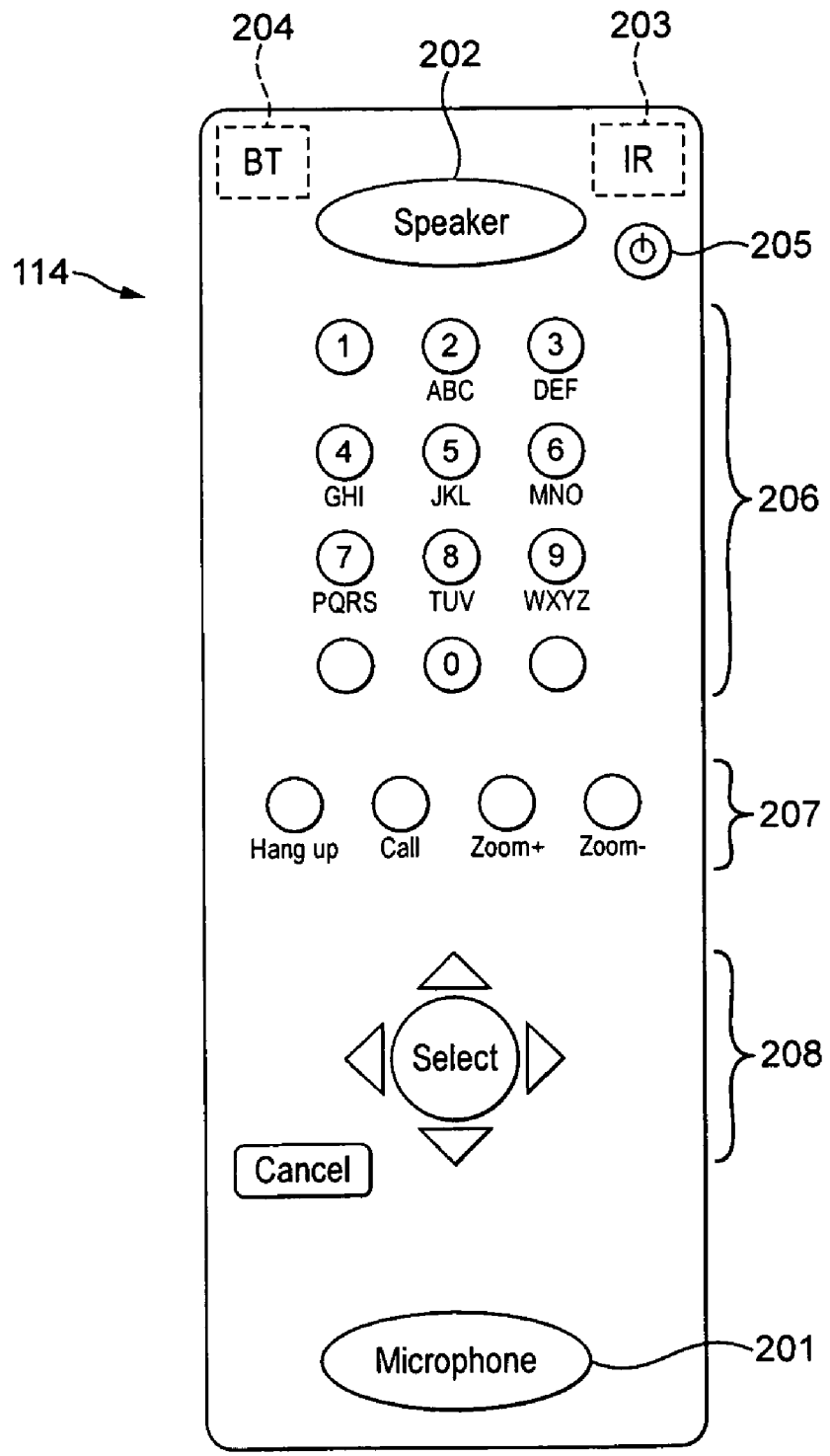
FIG. 2 is a schematic representation of a remote control unit.

Each television set 103 has an associated remote control unit 114, an example of which is illustrated in FIG. 2.

As shown in FIG. 2, the remote control unit (or just "remote control") comprises a microphone 201, speaker 202, a first remote interface in the form of an infrared (IR) transmitter 203, and a second remote interface in the form of a short-range RF interface 204 such as a Bluetooth interface. The microphone 201 and speaker 202 are operatively coupled to the Bluetooth interface 204. The remote control 114 is thus arranged to communicate voice signals from the microphone 201 to the television 103 via the Bluetooth interface 204, and to receive voice signals from the television 103 via the Bluetooth interface 204 for playing out of the speaker 202.

The remote control 114 further comprises a plurality of buttons operatively coupled to the infrared transmitter 203, arranged so as to allow the user to control the television 103 via the infrared transmitter 203. The buttons comprise a "standby" button 205 for setting the television into a low-power mode. The buttons further comprise numerical or alphanumeric buttons 206 for changing channel or supplying other numerical or alphanumerical data to the television 103; function buttons 208 for controlling various functions of the television 103, e.g. for controlling a cursor and/or menu system; and optionally dedicated calling buttons 207 for performing specific dedicated operations relating to the calling functionality of the client application 113, e.g. "call", "hang up", or buttons for zooming in and out during a video call.

Figure 3A:
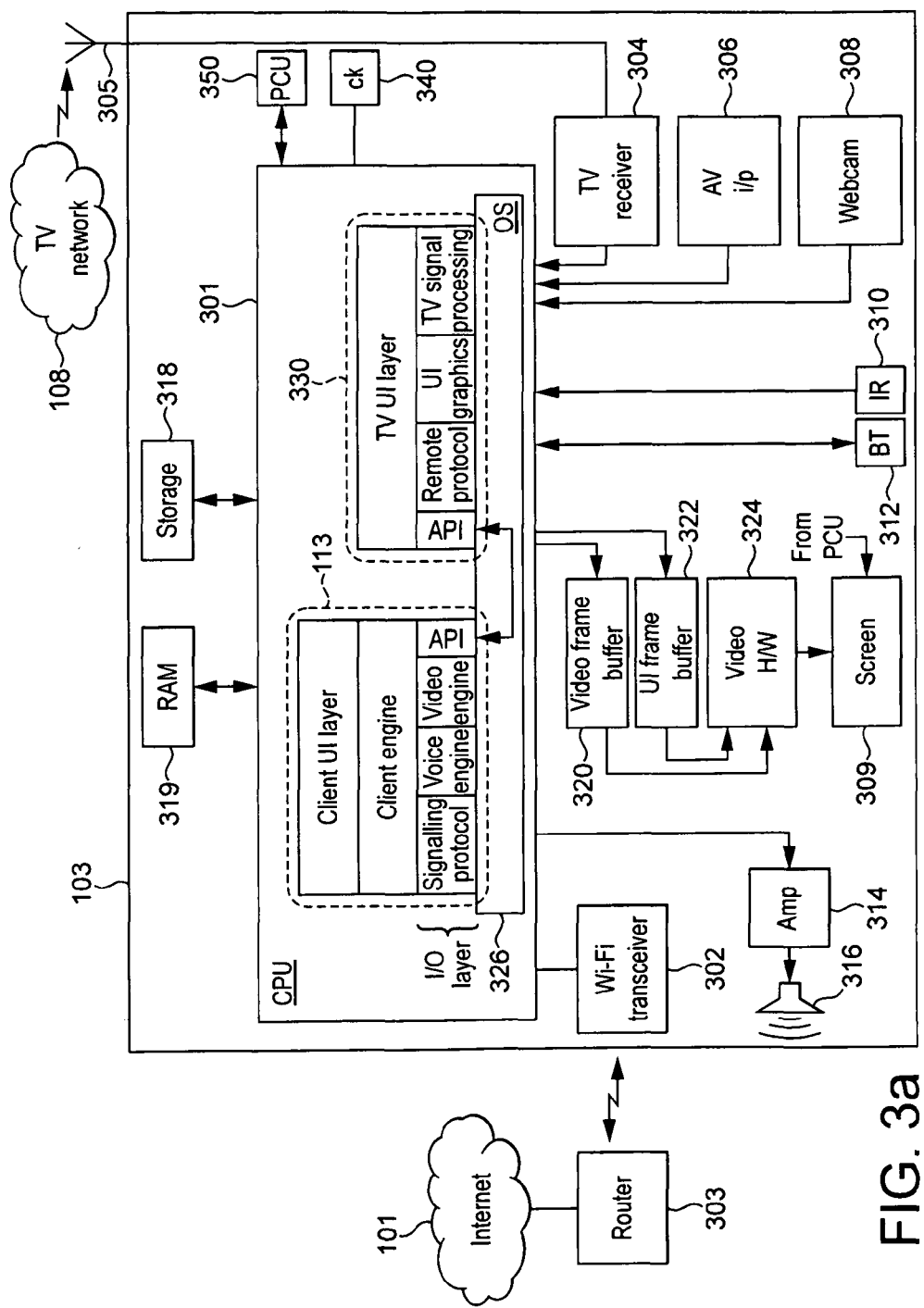
FIG. 3a is a schematic block diagram of a television set.

FIG. 3a is a schematic block diagram of a television set 103 according to an exemplary embodiment of the present invention. The television set 103 is a dedicated television unit in the sense that its primary purpose is as a television, and is designed to fulfill the role of a family or household television. However, at the same time it is additionally provided with secondary embedded functionality such as VoIP calling.

The televisions set 103 comprises, within a single casing: an embedded processing apparatus 301; a random access memory (RAM) 319; and an embedded non-volatile storage device 318 which may comprise an electronically erasable and reprogrammable memory (EEPROM or "flash" memory), a magnetic storage medium, and/or a one-time writable ROM. The non-volatile storage device 318 is coupled to the processing apparatus 301 and stores a basic operating system (OS) 326, a television application 330, and a communication client application 113 such as a VoIP client. The processing apparatus 301 is arranged to execute the operating system 326, e.g. either by fetching instructions directly from ROM or by first loading from a flash memory into the RAM 319 before fetching. When executed, the operating system 326 is configured to load the television application 330 and client application 113 into RAM 319 and schedule them for execution on the processing apparatus 301. The processing apparatus 301 is thus arranged to run the television application 330 and client application 113 under control of the operating system 326. In embodiments only a minimal operating system 326 may be required, in the form of a basic scheduler.

The television set 103 further comprises, within the same casing: a video frame buffer 320 and user interface (UI) frame buffer 322, video hardware 324, a screen 309, an amplifier 314 and speaker 316 or output to an external speaker or headphones, a television receiver 304, an external audio-video (AV) input 306 such as a SCART or HDMI input from an external source, a webcam or webcam input 308 for connecting to an external webcam, a network interface 302 in the form of a first short-range RF transceiver such as a wi-fi transceiver, a first remote interface 310 in the form of an infrared (IR) receiver, and a second remote interface in the form of a second short-range RF transceiver 312 such as a Bluetooth transceiver.

The video frame buffer 320 and user interface (UI) frame buffer 322 each have an input coupled to the processing apparatus 301. The video hardware 324 has an input coupled to the outputs of the video frame buffer 320 and UI frame buffer 322. The screen 309 has an input to the output of the video hardware 324. In embodiments, the frame buffers 320 and 322 could be dedicated hardware buffers or alternatively could be implemented in a general purpose memory. The amplifier 314 has an input coupled to the processing apparatus 301 and an output coupled to the speaker 316. The processing apparatus 301 is further coupled to the network interface 302, television receiver 304, auxiliary input 306, webcam input 308, infrared interface 310, and Bluetooth interface 312.

Any or all of the above components may be coupled to the processing apparatus 301 via intermediate components such as a bus and/or cache (not shown), as will be understood by a person skilled in the art.

The television receiver 304 comprises an input for connecting to at least one reception means such as an antenna, satellite dish or cable line, and is thus arranged to receive television broadcast signals from the television network 108 via the reception means. The television receiver 304 is a hardware front-end which may comprise for example: sampling circuitry, a low noise amplifier, a filter, a mixer, and/or an analogue-to-digital converter (ADC). Once received by the television receiver unit 304, the television signals are thus made available to the processing apparatus 301 for signal processing. The television application 330 comprises a signal processing engine in the form of code which, when executed, performs at least some of the required signal processing on the received television signals. The processed television signals are then output to the video frame buffer 320 and amplifier 314 for consumption by the end user. The signal processing engine may comprise for example: a digital filter, demodulator, demultiplexer, decoder, decryption block, and/or error checking block. However, different ways of allocating the television receiver and processing functionality between software and dedicated hardware are also possible. E.g. in embodiments, more of the functionality such as the demultiplexing could be moved to the receiver front-end 304. Techniques for receiving and processing television signals will be known to a person skilled in the art.

In the case of traditional analogue television broadcasts, the signals of a plurality of different concurrent programs (of different TV channels) are frequency-division multiplexed over the airwaves by being transmitted on different frequencies. The television receiver 304 will then comprise a tuning circuit to demultiplex the broadcasts and thereby separate out the signal of the required programme. In the case of digital television broadcasts, the signals of different concurrent programs are each divided into packets and interleaved so as to time-division multiplex the different programs' signals into a transport stream for broadcast. The signal processing engine of the television application 330 will then comprise a packet filter to demultiplex the packets of different transport streams and so separate out the signal of the required programme. Multiple transport streams may also be broadcast on different frequencies, requiring a tuner as well. Furthermore, for digital television, one or more of the transport streams may comprise additional programme information such as an electronic programme guide (EPG).

Video signals for output to the television screen 309 may also be received via the AV input 306 from an external source such as a DVD player or games console.

The television application 330 further comprises a UI graphics engine, a remote protocol engine, an application programming interface (API), and a television UI layer. The overall operation of the signal processing engine, UI graphics engine, remote protocol engine and API is controlled by the television UI layer. The user can select which broadcast to view by pressing buttons 205, 206, 208 on the remote control 114, causing the remote control 114 to communicate control signals to the processing apparatus 301 via the infrared transmitter 203 and receiver 310. The user may also use the buttons in a similar manner to view additional information such as the EPG or control menus, and to navigate the EPG or menus. The relevant control signals are interpreted by the remote protocol engine of the television application 113, which in turn communicates with the television UI layer. In response, the television UI layer controls the signal processing engine to output the relevant television programme to the video frame buffer 320, and/or controls the UI graphics engine to output graphics to the UI frame buffer 322 (e.g. to display the graphics of the menu or EPG). The frame buffers 320 and/or 322 supply their contents to the video hardware 324 for display on the screen 309. In embodiments the UI frame buffer 322 and video hardware 324 may be arranged to overlay UI graphics over the current television programme in a partially transparent manner, and/or to leave at least part of the television programme visible.

As mentioned, the television set 103 comprises a network interface 302. In preferred embodiments this takes the form of a wireless transceiver such as a wi-fi transceiver, for communicating wirelessly with a household or office-based wireless router 303 as found in most modern homes or offices. The router 303 in turn connects to the Internet 101. However, in alternative embodiments the network interface 302 may comprise other options such as a wired modem or a port to an external wired modem.

The communication client application 330 comprises a protocol stack having an I/O layer which, when executed on the processing unit 301, is operable to transmit and receive signals over the Internet 101 via the network interface 302. The I/O layer comprises a network signalling protocol for transmitting and receiving control signals over the Internet 101 via the network interface 302. The I/O layer may also comprise an API for communicating with the API of the television application 301.

The I/O layer further comprises a voice engine comprising a voice codec. The voice engine is arranged to accept speech signals from the microphone 201, and to encode those speech signals for transmission over the internet 101 via the network interface 302. The voice engine is also arranged to decode speech signals received over the Internet 101 via the network interface 302, for output to the television's amplifier 314 and speaker 316, or to the speaker 202 in the remote control 114 via the Bluetooth interfaces 312 and 204. The I/O layer further comprises a video engine comprising a video codec. The video engine is arranged to accept video signals from the webcam input 308, and to encode those video signals for transmission over the Internet 101 via the network interface 302. The video engine is also arranged to decode video signals received over the Internet 101 via the network interface 302, for output to the UI frame buffer 322, video hardware 326 and screen 309. Alternatively, in a full-screen mode the video codec could output video via the video frame buffer 320.

Higher up the protocol stack, the client application 113 comprises a client engine which is responsible for call-set up. The client engine controls the network signalling protocol engine of the client 113 in order to establish a live voice or video call with another user terminal 102 or 103 over the Internet 101, preferably using P2P call set-up as discussed above, or potentially using a centralized call set-up via a server. The client engine may also handle other functions such as connection management, authentication, encryption, and/or exchanging presence information with the client applications 111 or 113 of other user terminals (presence information indicates the availability of a user for communication, and is preferably at least partially defined by the respective user themselves).

Even higher up the protocol stack, the client application 113 comprises a client UI layer which is responsible for the client's user interface. The client UI layer is operable to generate a client user interface for output to the UI frame buffer 322, video hardware 324 and screen 309. This may be output via the APIs and the UI graphics engine of the TV application 330 under control of the TV UI layer (or alternatively the client application 113 could be provided with its own UI graphics protocol to output graphics to the UI frame buffer 322 directly). The client user interface thus presents the user with on-screen controls which they can activate using buttons 206, 207, 208 on the remote control 114. Based on these button presses, the remote control 114 communicates control signals to the processing apparatus 301 via the infrared transmitter 203 and receiver 310. These control signals may be interpreted by the UI protocol engine in the television application 330 and then signalled via the APIs to the I/O layer of the client application 113 (or alternatively the I/O layer of the client application 113 could be provided with its own remote control protocol to interpret these control signals directly). In turn, the protocol of the I/O layer of the client 113 communicates with the client UI layer. The client UI layer is thus configured to respond to user inputs in order to control the overall operation of the client application 113, e.g. allowing a user to select contacts to call, hand up, etc.

Figure 4:
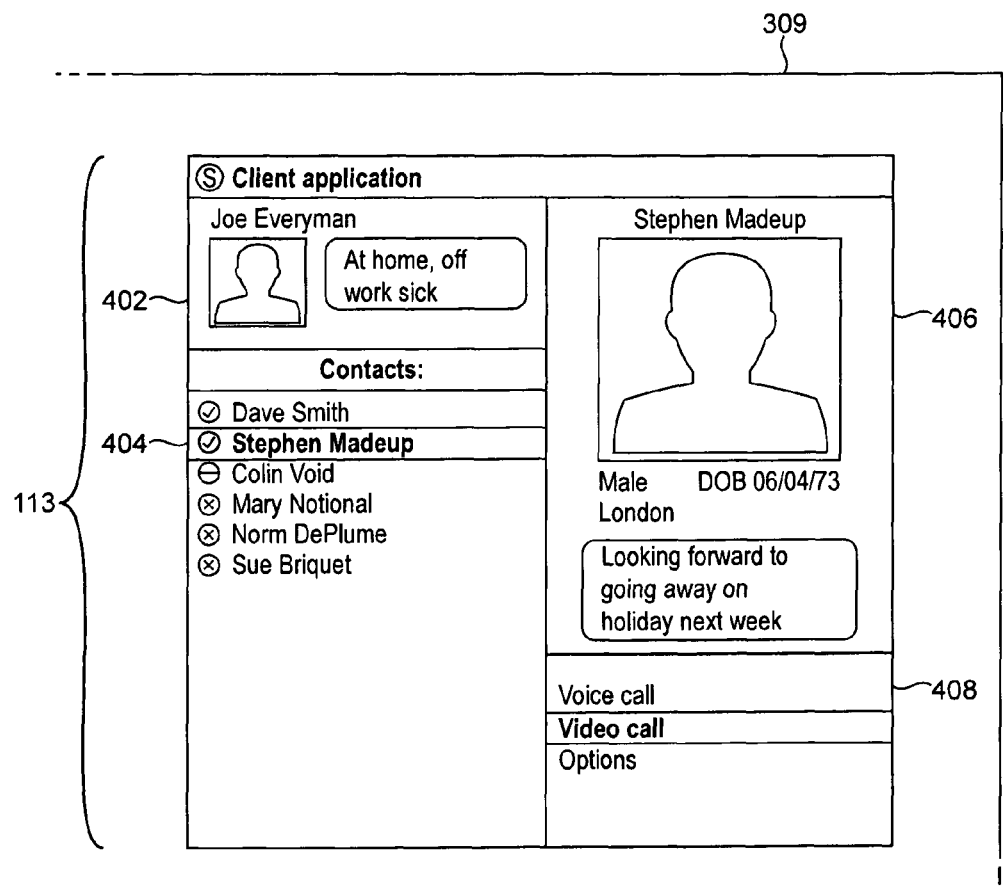
FIG. 4 is a schematic representation of a user interface.

FIG. 4 illustrates an example user interface which could be displayed on the screen 309 by the client application 113, when summoned by the user using the relevant buttons of the remote 114. The user interface may be displayed only on part of the screen 309, allowing at least a portion of a currently viewed programme to remain visible; or may alternatively take up the whole screen 309. The displayed user interface comprises a number of panels. For example, the user interface may comprise a first panel 402 showing profile information of the user of the television 103 on which the client 113 is running. E.g. the profile information may comprise the user's name, an "avatar image" (a picture which the user has chosen to represent themselves), and/or a "mood message" (a short user-defined statement for inclusion in their profile). Further, the user interface may comprise a second panel 404 showing a list of the user's contacts (preferably the client 113 is configured to only allow calls between users who have agreed to be contacts). Further, the user interface may comprise a third panel 406 showing a profile of a selected one of the contacts, and/or a fourth panel 408 providing a menu or other controls for selecting to call the selected contact.

Furthermore, the UI layer of the client 113 may be configured to communicate with the UI layer of the television application 330, via the APIs and the operating system 326. This allows the client application 113 and television application 330 to negotiate control of the screen 309 and/or speaker 316 or 202.

Whether the client application 113 or television application 330 takes precedence may depend on the implementation and/or situation. Since the television set 103 is primarily a television, then preferably the client application 113 should require permission from the television application 330 before controlling the screen 309 or speaker 316 or 202. However, in embodiments a user-defined setting may be provided allowing the user to control whether or not the client application 113 can autonomously take control of the screen 309 and/or speaker 316 or 202, e.g. to notify the user in event of an incoming call. This setting would preferably be stored in a non-volatile memory 318 and be readable by the client application 113 and/or television application 330. E.g. the television application 330 may be configured to read a setting from memory and, if set, to unequivocally allow the client application 113 to control the screen and/or speaker. Alternatively the client application 113 may be configured to read a setting from memory and, if set, to control the screen and/or speaker without seeking permission from the television application 330.

Figure 5A:
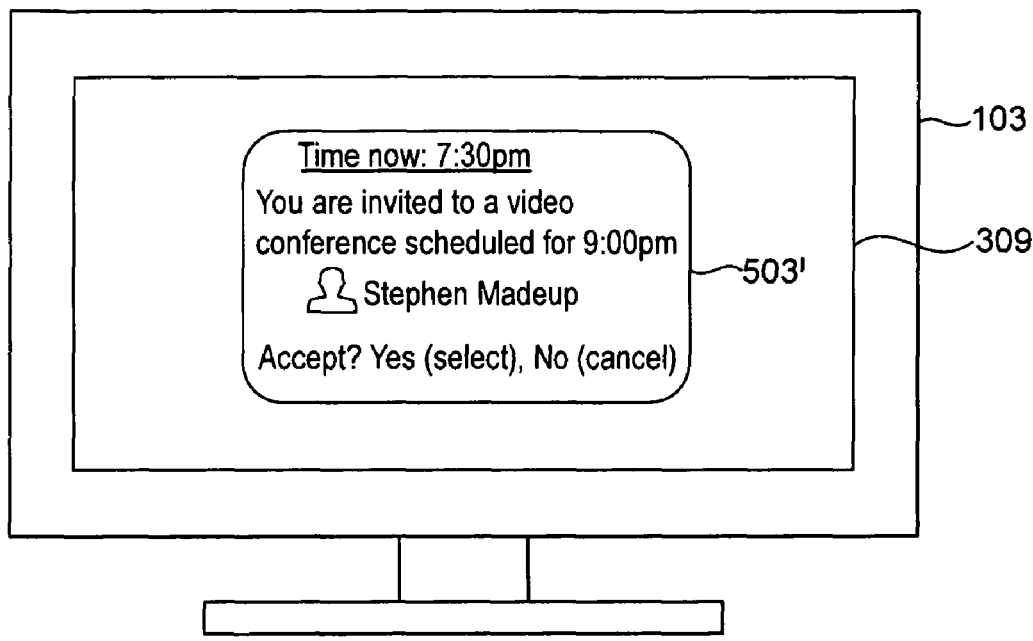
FIG. 5a is another schematic representation of a user interface.
Figure 5B:
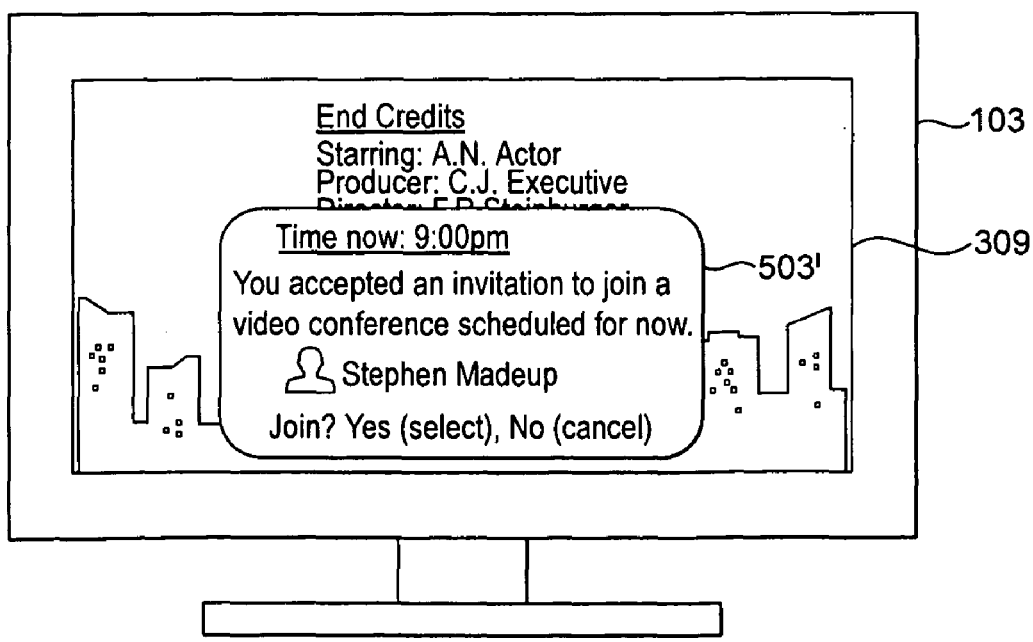
FIG. 5b is another schematic representation of a user interface.
Figure 5C:
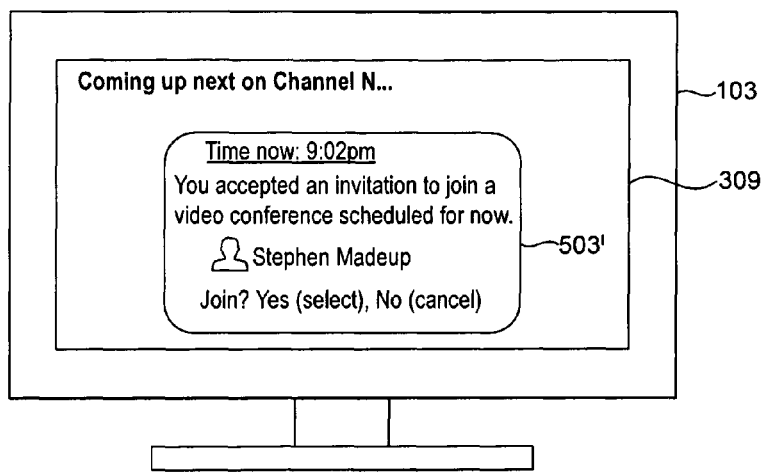
FIG. 5c is another schematic representation of a user interface.

Referring to FIGS. 5a-5c, in a particularly advantageous embodiment of the present invention, the client application 113 is configured to receive and interpret signals carrying automated invitations from other remote user terminals 102 or 103 over the Internet or other packet-based network 101 (via the network interface 302). An automated invitation signal comprises a condition specifying a future event for triggering a communication session, such as a scheduled time or the end of a particular television programme. If the local user accepts the invitation, the local (invitee) client 113 is set to automatically monitor the condition and join the session upon the condition being met, i.e. upon occurrence of the event. So the condition is generated and transmitted by the remote (inviter) terminal, but evaluated and acted upon at the local (invitee) terminal.

As shown in FIG. 5a, assuming the feature is not disabled by a user-setting, when an invitation signal is initially received at the local communication client 113 then it may automatically output a first on-screen control prompt 503 to the screen 309. The prompt 503 comprises an on-screen indication that the local user has been invited to a join a communication session, and may indicate the type of session.

For example, the proposed session could be a voice or video call. In one particularly useful application, the proposed session is a multiparty voice or video conference. Multiparty voice or video conference is a term generally used in the art to mean a call with multiple other (remote) users, i.e. at least three users in total (though note that "conference" in this sense does not necessarily imply a business conference, and could also cover social scenarios). Other invitees would be invited to join in a similar manner.

In another particularly useful application, the proposed session comprises an interactive photo slideshow, preferably hosted on the remote terminal 102 or 103 of the remote user issuing the invitation. The interactive photo slideshow allows multiple other users to view a live slideshow of the host's photographs over the internet 101 via the network interfaces 302, and includes interactive features such as the joined invitees being able to comment on the show by voice call over the internet 101 and network interfaces 302, or being able to control aspects of the slideshow remotely by means of control signals fed back to the host over the internet 101 via the network interfaces 302. E.g. other users than the host may be enabled to control the speed of the slideshow, pause a certain slide, move on to a next slide, etc. A protocol may be provided to determine how the show is controlled in the event that two users issue contradictory control signals.

The first prompt 503 may comprise an indication of the remote user who has sent the invitation signal to propose the session (the inviter). It may also comprise an indication of the other invitees in the case of a multiparty session. The first prompt 503 may further comprise a textual message signalled in the invitation signal from the remote user issuing the invitation, or a predetermined textual message. Furthermore, the first prompt 503 may comprise an indication of the scheduled time for the proposed session, or indication of another event upon which the beginning of the session is conditional (see discussion below in relation to FIGS. 5b and 5c).

Furthermore, the first control prompt 503 presents the local user with the option of accepting or declining the invitation. This user-input may be provided using buttons 207 or 208 on the remote control 114.

In a particularly preferred embodiment, the television set 103 comprises a power control unit 350 coupled to the processing apparatus 301 and television screen 309, for switching between two or more power modes of the television set 103. As well as fully on, the power modes preferably include at least a "standby" type mode in which the screen 309 is turned off but the processing apparatus 301 and network interface 302 are maintained at least at a certain level of operation enabling the client application 113 to continue running and thereby monitor the network interface 302 for incoming signals received over the internet 101. In this case, the client application 113 is preferably configured so as, if an invitation signal should happen to arrive while the television screen is turned off, to issue a power control command to the PCU 350 controlling it to return the television 103 to a higher power mode in which the screen is turned on, enabling display of the first control prompt 503.

As shown in FIG. 5b, in one embodiment the condition signalled in the invitation signal comprises a scheduled time for the session to begin. In this case the client application 113 monitors the current time. This could be done based on a local clock 340, or by receiving updates of the current time from the Internet 101 or television network 108. When the client 113 detects that the current time matches the scheduled time, it automatically outputs a second on-screen control prompt 503' to the screen 309. The second prompt 503' comprises an indication that the time for the scheduled session has arrived, and provides the user with the option to either join the session or decline. Again, this user-input may be provided using buttons 207 or 208 on the remote control 114. If the local user accepts, the client engine of the client application performs the necessary set-up signalling to join the call, conference or other communication session.

The second prompt 503' may also comprise additional information, such as a reminder of the identity of the inviter or other invitees, and/or a textual message.

The client application 113 and processing apparatus 301 are preferably configured to continue monitoring the current time when the television set is in the low power "standby" type mode. If the screen is turned off when the scheduled time occurs, the client application 113 may issue a power control command 350 in order to wake up the screen 309 and thereby enable the second prompt 503' to be displayed.

Although note, the client 113 will not monitor the condition nor output the second prompt 503' if the local user declined the invitation in response to the first prompt 503. Note also that the reaction of the local user terminal 103 to the received invitations and/or to the events (including the display pf the prompts 503, 503' and the joining of the call) may be made dependent on a user setting of the local user (invitee). E.g. by setting his or her presence status is set to "do not disturb" (DND), the invited user may suppress invitations, and/or suppress the subsequent joining of the session in response to the event even if the invitation was previously accepted.

As shown in FIG. 5c, in another embodiment the condition received in the invitation signal comprises a specified delineation in a viewing activity, such as the end of a particular television programme that the local user (invitee) and/or remoter user (inviter) may be watching. For example, one or both may be fans of a particular programme during which they would want to be distracted by a call or other session, but the inviter may want to ensure the session is not forgotten, or the two may wish to automatically schedule a session to discuss the programme after it is over.

This could be done as in FIG. 5b, by scheduling a predetermined time at which the programme is supposed to end. An alternative however is discussed in relation to FIG. 6.

Figure 6:
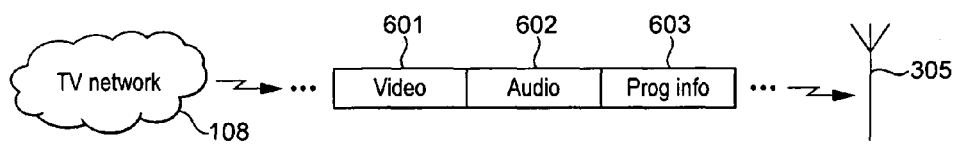
FIG. 6 schematically illustrates transmission of a transport stream.

As illustrated schematically in FIG. 6, a digital television broadcast may comprise audio data 601 and video data 602 of one or more programme streams all interleaved together (i.e. time-division multiplexed) into a combined transport stream for transmission on a particular frequency. Also interleaved into the transport stream is additional program information 603 providing timing information for the one or more programmes (potentially amongst other information such as subtitles and textual programme summaries or précis). The additional programme information 603 may take the form of a general data stream multiplexed into the transport stream in conjunction with a plurality of programme streams, providing programme information for a plurality of programmes. An example of this would be an electronic program guide (EPG). Alternatively or additionally, individual respective programme information may be provided in the stream of each programme. For example the programme information 603 may comprise a real-time indication of the programme's actual end. The audio data, video data and additional programme information are decoded by the signal processing engine of the television application 331, and the required programme timing information can be accessed by the client application 113 via the APIs under control of the TV UI layer.

Thus instead of a time, the received invitation signal may comprise an indication of a particular television programme after which the session is to be scheduled. In this case, the local client application 113 (the invitee) is configured to map the indication received in the invitation signal (received over the Internet 101 via the local network interface 302) to the relevant programme information 603 (received over the television network 108 via the local television receiver 304), and to monitor for the end of the programme accordingly. This may be achieved by comparing the current time to a time scheduled in the EPG or such like, or by monitoring for receipt of a real-time indication of the actual end of the programme in the programme information 603. The latter case is illustrated in FIG. 5b, which is preferred since it takes into account the possibility that a programme may overrun.

Another way to detect the end of the programme would be to download a television schedule from the internet 101. In further embodiments, an alternative delineation in viewing activity that could be used to schedule the session would be the end of a computer game.

When the local (invitee) client 113 detects the end of the television programme specified by the remote terminal (inviter), it generates the second on-screen prompt 503' in a similar manner to that described above. Again, the local client 113 may be configured to monitor for occurrence of the event (in this example the end of the programme) even if the television 103 is in a standby type mode, in which case it may be configured to wake up the screen 103 upon occurrence of the event in order to display the second prompt 503'.

In yet another alternative embodiment, the event could be a trigger signal received by the local terminal (invitee) from the remote terminal (inviter), over the Internet 101 via the network interface 302. For example, the remote user who issued the invitation would later issue a second, trigger signal when he or she is ready for the session to begin (e.g. when a television programme they are watching has ended). In this case the condition received from the remote terminal comprises an indication to the local client 113 (invitee) that it should enter a state in which it is primed to respond to a certain predetermined trigger signal (the identity of the trigger signal itself need not be transmitted as a condition, just an indication to the local client 113 that the trigger signal is expected).

When the local (invitee) client 113 detects the trigger signal from the remote terminal (inviter), it generates the second on-screen prompt 503' in a similar manner to that described above. Again, the local client 113 may be configured to monitor for occurrence of the event (in this by monitoring the network interface 302 for the trigger signal) even if the television 103 is in a standby type mode, in which case it may be configured to wake up the screen 103 upon occurrence of the event in order to display the second prompt 503'.

It will be appreciated that the above embodiments have been described only by way of example.

For instance, the above has been described in terms of a local client 113 on a local terminal receiving invitations from a remote terminal. Conversely however, the local client 113 is preferably also configured to generate and transmit invitations to the remote clients on other terminals. That is, the client 113 on each of a plurality of terminals 102 and/or 103 is preferably configured to both generate invitations for hosting or establishing sessions; and receive, interpret and evaluate invitations from other terminals 102 and/or 103.

Note also that the term "programme" does not limit to any particular kind of programme content, and could refer for example to a film, soap opera, documentary, sporting event, news program, etc.

Further, other ways of allocating the various client, television and other functionality amongst different processors are envisaged. For example, one or more dedicated signal processors (DSPs) could be arranged to execute the television signal processing engine of the television application 330 and/or the video engine and/or voice engine of the client application 113; with one or more separate CPUs being arranged to execute the UI layer, client engine, protocol and graphics engines of the client application 113 and/or the UI layer and protocol and graphics engines of the television application 330. In another example, the client application and television application would each be run on a different respective CPU embedded in the television set 103. Some or all of the functionality of the television application 330 could alternatively be implemented in dedicated hardware, including the possibility of hardwired signal processing apparatus in the television receiver front-end 304.

Furthermore, although the preferred application, the invention is not limited to use in a television set having the above components including television screen all within one single self-contained casing. In another application, the invention could be implemented in a set-top box for plugging into such a television set. In that case the diagram would be similar to that of FIG. 3a but with the television hardware 320, 322, 324 and screen 309 replaced by an audio-video (AV) output.

Figure 3B:
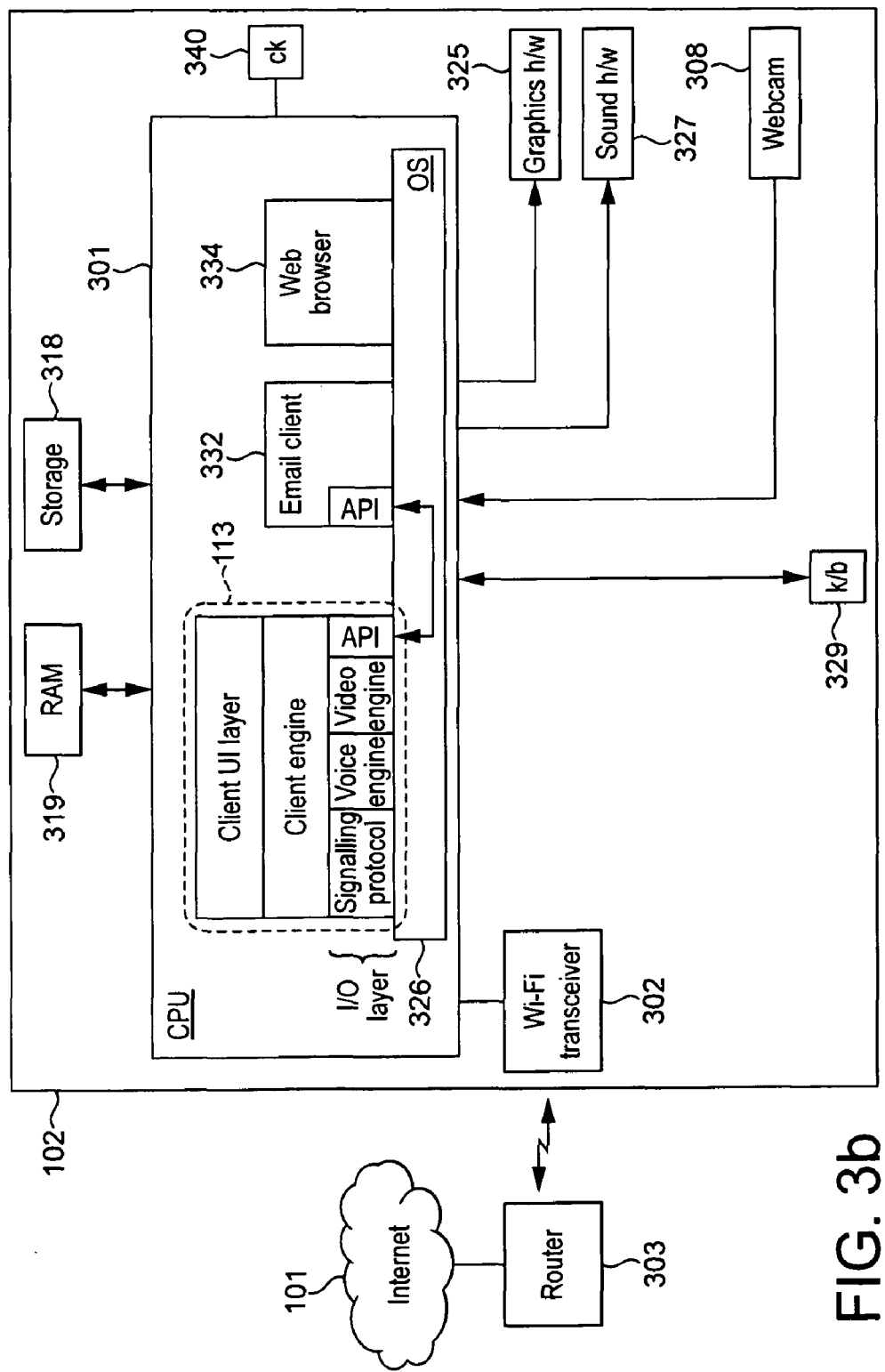
FIG. 3b is a schematic block diagram of a personal computer.

In another application as illustrated schematically in FIG. 3b, the described client application 113 may be installed on a desktop or laptop PC type computer terminal 102, or a mobile terminal having computing type functionality and Internet access. Similarly to the television 103, the computer terminal 102 comprises a processing apparatus 301 in the form of one or more CPUs, coupled to: a non-volatile storage means 318 such as hard drive, flash memory and/or optical disc drive; a RAM 319; a webcam or input 308 from a webcam; and a network interface 302 such as a wi-fi transceiver for accessing a packet-based network such as the Internet 110 (e.g. via wireless router 303). The processing apparatus 301 is further coupled to graphics hardware 325 (sometime referred to as a graphics card or graphics adapter) for outputting graphics to an external or inbuilt screen, and coupled to sound hardware 327 (sometimes referred to as a sound card) for outputting audio signals to external or inbuilt speakers or to headphones. The processing apparatus is further coupled to in input for receiving inputs from the user 329, such a keyboard or keyboard input, and/or a touchpad, touch screen or mouse input.

The computer terminal is also installed with other applications such as an email client 332 and/or web browser 334. In one particularly advantageous embodiment, an API in the I/O layer of the VoIP client 113 may be configured to communicate with an API of the email client 332, providing a "plugin" to the email client so that the two applications can share invitation information. E.g. so an invitation signal for the VoIP client 113 may be interpreted by the email client 332 and incorporated into its pre-existing calendar feature, and/or an invitation for the calendar feature of the email client 332 may be interpreted by the VoIP client 113 and used to set up automated invitations to bidirectional communication sessions in a similar manner to that discussed above.

Generally speaking the present invention can be applied to any media appliance having video apparatus for outputting signals to a television screen. The video apparatus may comprise any combination of dedicated hardware and/or regions of memory storing software modules, with any software modules being executed on either the same or a different processor unit as the client application 103. Depending on the appliance and the implementation, the video apparatus may take different forms. In the example television set of FIG. 3a for example, the video apparatus may be said to comprise a combination of the frame buffers 320 and 322, video hardware 324, and/or a region of the non-volatile memory 318 storing signal processing code of the television application. In the example computer terminal 102 of FIG. 3b, the video apparatus may be said to comprise the video hardware 325, and/or a region of the non-volatile storage 318 storing code for displaying graphics.

Further, the present invention need not be limited by television broadcasts. With increasing popularity of packet-based television services, there may be interest in the idea of a dedicated television set with the capability of receiving packet-based television signals, either over the Internet or a dedicated packet-based service.

Furthermore, note that the present invention is not limited particularly to VoIP or to a peer-to-peer topology. Other packet-based networks, protocols and methods of call set-up may also be used.

Other variations of the present invention may be apparent to a person skilled in the art given the disclosure herein. The scope of the present invention is not limited by the described embodiments, but only by the appendant claims.

The invention claimed is:

1. A media appliance comprising:
video apparatus for outputting signals to a screen;
a network interface for accessing a packet-based network;
a memory storing a communication client application; and
processing apparatus coupled to the memory, network interface and video apparatus, and arranged to execute the communication client application;
wherein the client application is configured so as when executed to allow a local user of the media appliance to participate in bidirectional communication sessions with other remote users via the network interface and packet-based network;
the client application is further configured so as when executed: to receive an invitation signal from a remote user terminal over the packet-based network, the received invitation signal comprising a trigger condition specifying a future event for triggering participation of the media appliance in a proposed one of said communication sessions with said remote user terminal; to monitor the received trigger condition at said media appliance; and to join the proposed session in dependence on an occurrence of said event; and
a control device configured to allow a user to control the output of signals from the video apparatus to the television screen, thereby selecting a viewing activity; and
wherein said media appliance is configured to recognize a delineation event comprising a delineation in the viewing activity, and the client application is configured to detect an occurrence of the delineation in said viewing activity and to join a proposed session in dependence of said detection.

2. The media appliance of claim 1, wherein the client application is configured to generate a first control prompt on the screen upon receiving the invitation signal, said monitoring being dependent on a user-input from the local user in response to the first control prompt.

3. The media appliance of claim 2, wherein the client application is configured to generate a second control prompt on the screen upon occurrence of said event, said joining being further dependent on a user-input from the local user in response to the second control prompt.

4. The media appliance of claim 3, wherein the received invitation signal comprises information for use in at least one of said first and second control prompts.

5. The media appliance of claim 3, comprising power control circuitry coupled to the processing apparatus and screen, wherein the client application is configured to issue a power control command to the power control circuitry upon receipt of at least one of the invitation signal and occurrence of the event, so as to turn on the screen to display at least one of the first and second control prompts respectively.

6. The media appliance of claim 1, wherein the client application is configured so as when executed to allow a local user of the media appliance to participate in multiparty communication sessions with multiple other remote users via the network interface and packet-based network, the received invitation signal comprising a trigger condition specifying a future event for triggering a proposed one of said multiparty communication sessions with a plurality of remote user terminals including the remote user terminal from which the invitation signal was received.

7. The media appliance of claim 1, wherein the trigger condition specifies a future event for triggering participation of the media appliance in a voice or video call with said remote user terminal via the network interface and packet-based network, the client application being configured to join the voice or video call in dependence on the occurrence of said event.

8. The media appliance of claim 1, wherein the trigger condition specifies a future event for triggering participation of the media appliance in an interactive photo slideshow hosted by said remote user terminal over the packet-based network, the client application being configured to join the interactive photo slideshow in dependence on the occurrence of said event.

9. The media appliance of claim 1, wherein the specified event comprises a scheduled time, the client application being configured to monitor whether a current time matches the scheduled time and to join the proposed session in dependence on the match.

10. The media appliance of claim 1, wherein the specified event comprises receipt of a trigger signal from the remote user terminal over the packet-based network, the client application being configured to monitor for receipt of the trigger signal and to join the proposed session in dependence its receipt.

11. The media appliance of claim 1, wherein:
the media appliance comprises a television receiver for receiving television signals representing television programmes via a television network;
the video apparatus is coupled to the television receiver, and is operable to output the television signals of selected television programmes from the television receiver to the screen;
the control device is configured to allow a user to control the output of television signals to the screen, thereby selecting television programmes as said viewing activity; and
said delineation event comprises a delineation in the selected television programme, and the client application is configured to detect an occurrence of the delineation in said television programme and to join a proposed session in dependence of said detection.

12. A media appliance comprising:
video apparatus for outputting signals to a screen;
a network interface for accessing a packet-based network;
a memory storing a communication client application; and
processing apparatus coupled to the memory, network interface and video apparatus, and arranged to execute the communication client application;
wherein the client application is configured so as when executed to allow a local user of the media appliance to conduct bidirectional communication sessions with other remote users via the network interface and packet-based network; and
the client application is further configured so as when executed: to transmit an invitation signal to a remote user terminal over the packet-based network, the transmitted invitation signal comprising a trigger condition specifying a future event for triggering participation of the remote terminal in a proposed one of said communication sessions with the media appliance; and to establish the proposed session in dependence of a response to the invitation signal from the remote user terminal based on evaluation of the condition at the remote user terminal,
wherein the future event comprises a trigger signal to be transmitted to the remote user terminal over the packet-based network;
the media appliance comprises a television receiver for receiving television signals representing television programmes via a television network;
the video apparatus is coupled to the television receiver, and is operable to output the television signals of selected television programmes from the television receiver to the screen;
the media appliance comprises a control device configured to allow a user to control the output of television signals to the screen, thereby selecting television programmes for viewing; and
said media appliance is configured to recognize a delineation event comprising a delineation in the selected television programmes and further configured to join a proposed session in dependence of said recognition of the delineation event.

13. The media appliance of claim 12, wherein:
the client application is configured so as when executed to allow a local user of the media appliance to conduct multiparty communication sessions with multiple other remote users via the network interface and packet-based network; and
the client application is further configured so as when executed: to transmit an invitation signal to a plurality of remote user terminals over the packet-based network, the transmitted invitation signal comprising a trigger condition specifying a future event for triggering participation of the remote terminals in a proposed one of said multiparty communication sessions with the media appliance; and to host the proposed session in dependence on responses to said invitation signals from the remote user terminals based on evaluation of the condition at the respective remote user terminals.

14. The media appliance of claim 12, wherein the trigger condition specifies a future event for triggering participation of the remote terminal in a voice or video call with said appliance via the network interface and packet-based network, the client application being configured to establish the voice or video call in dependence on said response.

15. The media appliance of claim 12, wherein the trigger condition specifies a future event for triggering participation of the remote terminal in a photo slideshow hosted by said media appliance over the packet-based network, the client application being configured to host the interactive photo slideshow in dependence on said response.

16. The media appliance of claim 12, wherein the trigger condition specifies said event in the form of a scheduled time.

17. A method of operating a media appliance comprising video apparatus for outputting signals to a screen, a network interface for accessing a packet-based network, and an embedded processing apparatus; the method comprising:
executing a communication client application on the processing apparatus of the media appliance, the client application being configured so as when executed to allow a local user of the media appliance to participate in bidirectional communication sessions with other remote users via the network interface and packet-based network; and
receiving an invitation signal from a remote user terminal over the packet-based network, the received invitation signal comprising a trigger condition specifying a future event for triggering participation of the media appliance in a proposed one of said communication sessions with said remote user terminal;
wherein the execution of the client application further comprises monitoring the received trigger condition at said media appliance, and joining the proposed session in dependence on an occurrence of said event; and
enabling the media appliance to recognize a delineation event comprising a delineation in viewing activity on the screen, and the client application is configured to detect an occurrence of the delineation in said viewing activity and to join a proposed session in dependence of said detection.

18. A communication client application for operating a media appliance comprising video apparatus for outputting signals to a screen and a network interface for accessing a packet-based network, the communication client application comprising code embodied on a computer-readable medium and configured so as when executed on a processing apparatus of the media appliance to:
enable a local user of the media appliance to participate in bidirectional communication sessions with other remote users via the network interface and packet-based network;
receive an invitation signal from a remote user terminal over the packet-based network, the received invitation signal comprising a trigger condition specifying a future event for triggering participation of the media appliance in a proposed one of said communication sessions with said remote user terminal;
monitor the received trigger condition at said media appliance;
join the proposed session in dependence on an occurrence of said event; and recognize a delineation event comprising a delineation in viewing activity on the screen, detect an occurrence of the delineation in said viewing activity and to join a proposed session in dependence of said detection.

* * * * *